(12) United States Patent
Karatal et al.

(10) Patent No.: US 7,523,403 B2
(45) Date of Patent: Apr. 21, 2009

(54) PLACEHOLDER CONTROL OBJECT FOR CREATING AND VIEWING CONTENT IN CONNECTION WITH A CONTENT MANAGEMENT SERVER SYSTEM

(75) Inventors: Burhan Kerem Karatal, Bellevue, WA (US); Anthony Lawrence Jackson, Seattle, WA (US); Kevin Ka-Wang Lui, Bellevue, WA (US); Arul Kumaravel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 10/403,674

(22) Filed: Mar. 31, 2003

(65) Prior Publication Data

US 2005/0278475 A1    Dec. 15, 2005

(51) Int. Cl.
 *G06F 3/00* (2006.01)
 *G06F 9/00* (2006.01)
 *G06F 17/00* (2006.01)
(52) U.S. Cl. .................. 715/762; 715/760; 715/763; 715/764; 711/100
(58) Field of Classification Search ............... 715/908, 715/760, 762, 513, 763, 764; 711/100
See application file for complete search history.

(56) References Cited

U.S. PATENT DOCUMENTS

| | | | |
|---|---|---|---|
| 6,185,587 B1 * | 2/2001 | Bernardo et al. ............ 715/234 |
| 6,745,238 B1 * | 6/2004 | Giljum et al. ............... 709/219 |
| 2002/0046235 A1 * | 4/2002 | Foy et al. .................... 709/203 |
| 2002/0089539 A1 * | 7/2002 | Lindhorst et al. ........... 345/764 |
| 2002/0140729 A1 * | 10/2002 | Price et al. .................. 345/749 |
| 2002/0198878 A1 * | 12/2002 | Baxter et al. .................... 707/6 |
| 2003/0217332 A1 * | 11/2003 | Smith et al. ................. 715/513 |
| 2004/0205131 A1 * | 10/2004 | Saruhashi et al. ........... 709/205 |
| 2005/0144302 A1 * | 6/2005 | Kirkpatrick et al. ......... 709/231 |

* cited by examiner

*Primary Examiner*—Tadesse Hailu
*Assistant Examiner*—Anita D Chaudhuri
(74) *Attorney, Agent, or Firm*—Woodcock Washburn LLP

(57) ABSTRACT

A placeholder control object is positioned on a page of a web site hosted by a content management server (CMS). The CMS stores the page with the placeholder control object therein and serves same to a requestor thereof. In a presentation mode, the page and the placeholder control object therein are served by the CMS to a requesting viewer of the page at a browser thereof. In such presentation mode, the placeholder control object displays associated content to the viewer within the browser thereof. In an authoring mode, the page and the placeholder control object therein are served by the CMS to a requesting designer of the page at a browser thereof. In such authoring mode, the placeholder control object allows editing of the associated content by the designer within the browser thereof and saving the edited content to the CMS.

24 Claims, 6 Drawing Sheets

PLACEHOLDER CONTROL OBJECT FOR CREATING AND VIEWING CONTENT IN CONNECTION WITH A CONTENT MANAGEMENT SERVER SYSTEM

CROSS-REFERENCE TO RELATED APPLICATION

The present application is related to U.S. patent application Ser. No. 10/403,683 filed concurrently herewith and entitled "DYNAMIC LINK CONTROL OBJECT FOR DYNAMICALLY PRESENTING LINK OPTIONS IN CONNECTION WITH A CONTENT MANAGEMENT SERVER SYSTEM", hereby incorporated by reference in its entirety.

TECHNICAL FIELD

The present invention relates to a content management serer system with a placeholder control object that functions in an authoring mode to facilitate authoring of content on a page and in a presentation mode to facilitate presentation of the authored content on the page. More specifically, the present invention relates to such a placeholder control object that is served with the page and that assumes the proper mode depending on whether the page is being authored or presented.

BACKGROUND OF THE INVENTION

As may be appreciated, a content management server (CMS) is employed by an enterprise or organization to build, deploy, and maintain a content-rich web site such as that which may be accessible by way of the Internet or another network. Such a CMS streamlines the web publishing process, thereby reducing costly site maintenance and empowering the enterprise or organization to manage its own content. An example of such a CMS is provided by the MICROSOFT Content Management Server application, as developed and marketed by MICROSOFT Corporation of Redmond, Wash., USA.

Thus, a CMS is employed to deploy an Internet, intranet, or extranet web site, and provides tools necessary to build and deploy the core infrastructure of a web site, including site structure, presentation templates, site design, application integration, and security. In addition, once a site has been deployed, managers and content authors can use CMS tools to create, publish, and manage their own content.

Typically, a CMS provides content managers, authors, and the like with tools that enable such personnel to create and publish rich, personalized content directly to a web site. A role-based distributed publishing model is typically employed, where such model incorporates an approval workflow with multiple levels, automatic content scheduling and archiving, and content indexing. Developers can create centrally-managed page templates and publishing processes that ensure consistency across the site, thus ensuring adherence to organizational publishing standards and branding without diminishing the flexibility of the publishing environment.

In the prior art, a designer designing a page of content by way of a CMS would be required to employ a specialized authoring tool to lay out the page, and the specialized authoring tool would then convert the laid out page into an appropriate format in which such page is to be served by the CMS. An example of such an appropriate format is HTML or XML, although other formats can be employed. Thus, the designed designing the page had to possess a considerable amount of knowledge regarding the use and operation of the specialized authoring tool, full mastery of which could take a considerable amount of time.

As a result, a typical non-technical enterprise functionary could not easily edit a designed page, such as for example to modify the page or to create a similar page, without the aid of the designer. Moreover, such functionary could not easily create and design such a page without the aid of such designer.

Accordingly, a need exists for a CMS system with an authoring tool that is usable by a non-technical enterprise functionary to create, modify, and/or edit a page of content to be served by the CMS. More particularly, a need exists for such an authoring tool with a toolbox of control objects, where the functionary can at least in part design a page by laying out on the page one or more control objects from the toolbox and then editing each control object as necessary.

Even more particularly, a need exists for a placeholder control object that functions in an authoring mode to facilitate authoring of content on the page and in a presentation mode to facilitate presentation of the authored content on the page, depending on whether the page is being authored or presented. Accordingly, a functionary can navigate by way of the CMS to a page with one or more of such placeholder control objects, switch from a presentation mode to an authoring mode, and edit the navigated-to page. After editing is finished and the page is saved, the functionary can then switch from the authoring mode to the presentation mode and view the edited page as it would appear to any party requesting that same be served thereto.

With such a placeholder control object, authoring and presentation of the content associated with object are functionally separate, yet are designed together to seamlessly provide the appropriate editing and viewing functions. For example if in authoring mode, a placeholder control object can provide a text box control to edit text content, and if in presentation mode, the object can provide a literal control to simply render the edited text content. Since the placeholder control object is a composition of the text box control and the literal control, such control maintains the same layout between authoring and presentation and hence provides a WYSIWYG (what you see is what you get) effect.

In addition, a need exists for a dynamic link control object that functions to dynamically present navigation links to a viewer on a page depending on the context of the page. Thus, the presented links may depend on such factors as the page itself, the position of the dynamic link control object on the page, the position of the page within the hierarchy of a web site having such page, the history of the viewer prior to viewing the page, and/or other contexts relating to the page. Accordingly, a functionary designing the page need not specify each link to be presented to the viewer but need only place an appropriate dynamic link control object on the page, where the dynamic link control object automatically determines what links to be presented to the viewer based on the context of the page.

SUMMARY OF THE INVENTION

The aforementioned needs are satisfied at least in part by the present invention in which a placeholder control object is positioned on a page of a web site hosted by a content management server (CMS). The CMS stores the page with the placeholder control object therein and serves same to a requestor thereof. The placeholder control object and the page have a presentation mode and an authoring mode, and the placeholder control object has content associated therewith.

In the presentation mode, the page and the placeholder control object therein are served by the CMS to a requesting viewer of the page at a browser thereof. In such presentation mode, the placeholder control object displays the associated content to the viewer within the browser thereof. In the authoring mode, the page and the placeholder control object therein are served by the CMS to a requesting designer of the page at a browser thereof. In such authoring mode, the placeholder control object allows editing of the associated content by the designer within the browser thereof and saving the edited content to the CMS.

To employ the placeholder control object, a designer creates the page with the aid of the CMS and within a browser, and receives at the browser the served page and the placeholder control object therein from the CMS in the editable authoring mode. The designer edits the content of the placeholder control object and saves the page and the edited placeholder control object therein to the CMS, and receives at the browser the saved page and the placeholder control object therein from the CMS in the non-editable presentation mode.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
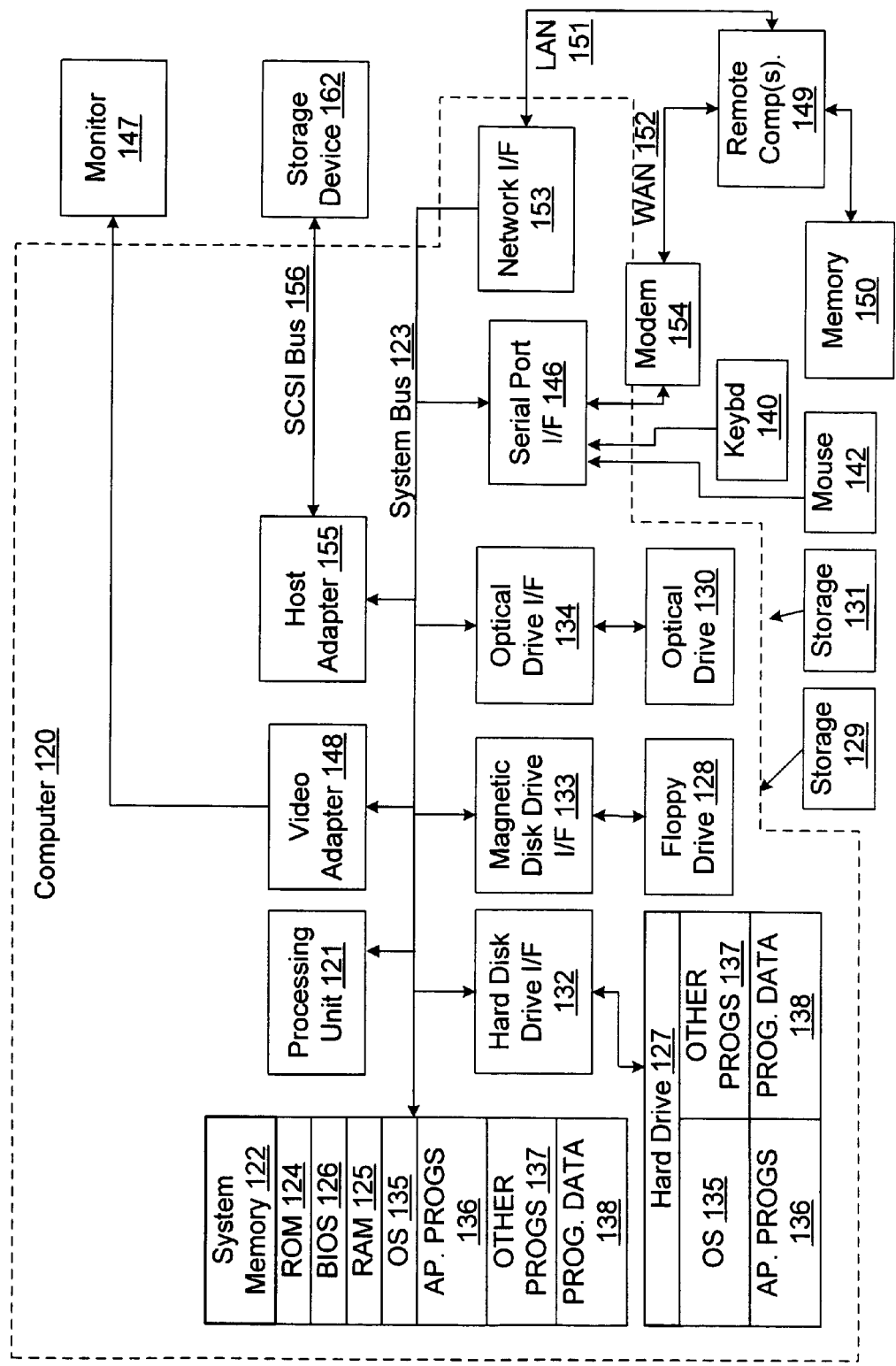
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Content Management Server System Overview

Figure 2:
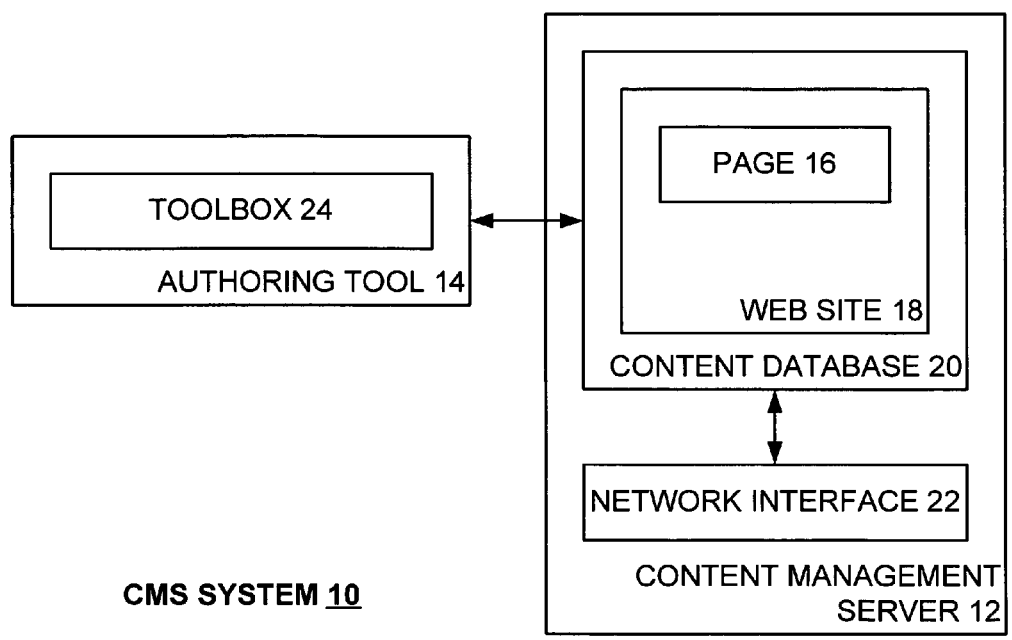
FIG. 2 is block diagram showing a content management server (CMS) system in accordance with one embodiment of the present invention.

In one embodiment of the present invention, and turning now to FIG. 2, a Content Management Server (CMS) system 10 includes a CMS 12 and an authoring tool 14 for allowing a user with appropriate access rights to navigate to a page 16 served by the CMS 10 and then edit such page 16.

The page 16 may have any content therein without departing from the spirit and scope of the present invention, although it is to be understood that the user is editing or modifying such page 16 for the purpose of being served by the CMS 12, and therefore the page 16 presumably has some relevance to a web site 18 hosted by the CMS 12. For example, if the web site 18 is an electronic storefront, the page 16 may relate to an item available for sale thereat. Likewise, if the web site 18 is a support site, the page 16 may be a knowledge base article.

The authoring tool 14 may be any appropriate application or tool associated with the CMS 12 without departing from the spirit and scope of the present invention, presuming that such tool 14 provides the functionality required by the user to in fact edit such page 16. For example, the tool 14 may be CMS-based and thus may be accessed by the user in the course of accessing the page 16 to edit same. Correspondingly, the tool 14 may be user-based and thus may be instantiated on a work station of the user. Notably, although the CMS 12 likely serves the page 16 in a format such as Hyper Text Markup Language (HTML), the tool 14 need not necessarily produce the page 16 in such HTML format. Instead, the CMS 12 could serve the page 16 in another format, or the tool 14 could produce the page 16 in another format after which the CMS 12 could convert the page into such HTML format as necessary.

The CMS 12 itself may be any appropriate CMS without departing from the spirit and scope of the present invention. Inasmuch as the CMS 12 is known or should be apparent to the relevant public, such CMS 12 need not be described in detail herein except as set forth. Typically, such CMS 12 includes a content database 20 within which is stored pages 16 to be served by such CMS 12 in the course of hosting the web site 18, and a network interface 22 by which the CMS 12 receives requests for such pages 16 and returns such pages 16 in response thereto. As may be appreciated, pages 16 within the content database 20 of the CMS 18 are stored with a pre-defined address such as a Universal Resource Locator (URL). Accordingly, a page 16 may be requested based on such URL and located within the content database 20 based on such URL.

In one embodiment of the present invention, and still referring to FIG. 2, the authoring tool 14 includes a toolbox 24 that has therein a plurality of tools or 'control objects' which a user may employ to construct a page 16 to be served by the CMS 12. In one embodiment of the present invention, each control object has some sort of content associated therewith, and the user can 'drag' a copy of a control object from the toolbox 24 and 'drop' such dragged control object onto a page 16 being created or edited.

Thus, the user can then position the dropped control object on an area of the page 16 and perhaps size same, and thereafter may edit the contents associated with or to be associated with such control object if such control object so allows. As a result, the control object is positioned on the page 16 in a manner in which a viewer views the page 16 after the page 16 is served thereto. Accordingly, the authoring tool 14 with the toolbox 24 and the control objects therein allows the user to design the page 16 essentially in a WYSIWYG (what you see is what you get) manner within a browser at a work station of the user. More specifically, within the browser, the user designs/edits/modifies/creates a page 16 by way of adding/removing/editing control objects in the page 16, and can then view the finished page 16 in the same browser. Thus, editing in particular is done within the 'look and feel' of the browser, and is thereby greatly simplified.

Note that a control object may be placed in a template from which a page 16 is to be designed. Thus, the page 16 as designed from the template automatically includes the control object and such control object can be modified as appropriate within the page. Note, too, that by placing control objects in a template and allowing a user to design a page 16 only from such a template, the user may be appropriately restricted as to what may be designed into a page. Thus, and as a result, a catalog designer that designs pages for catalog items can be restricted to a template that only allows such catalog designer to design such pages, and only in a predetermined style of layout. Such catalog designer can be restricted from, for example, templates for designing order entry pages, and can otherwise be restricted from designing pages to have inappropriate content.

Placeholder Control Object

Figure 3:
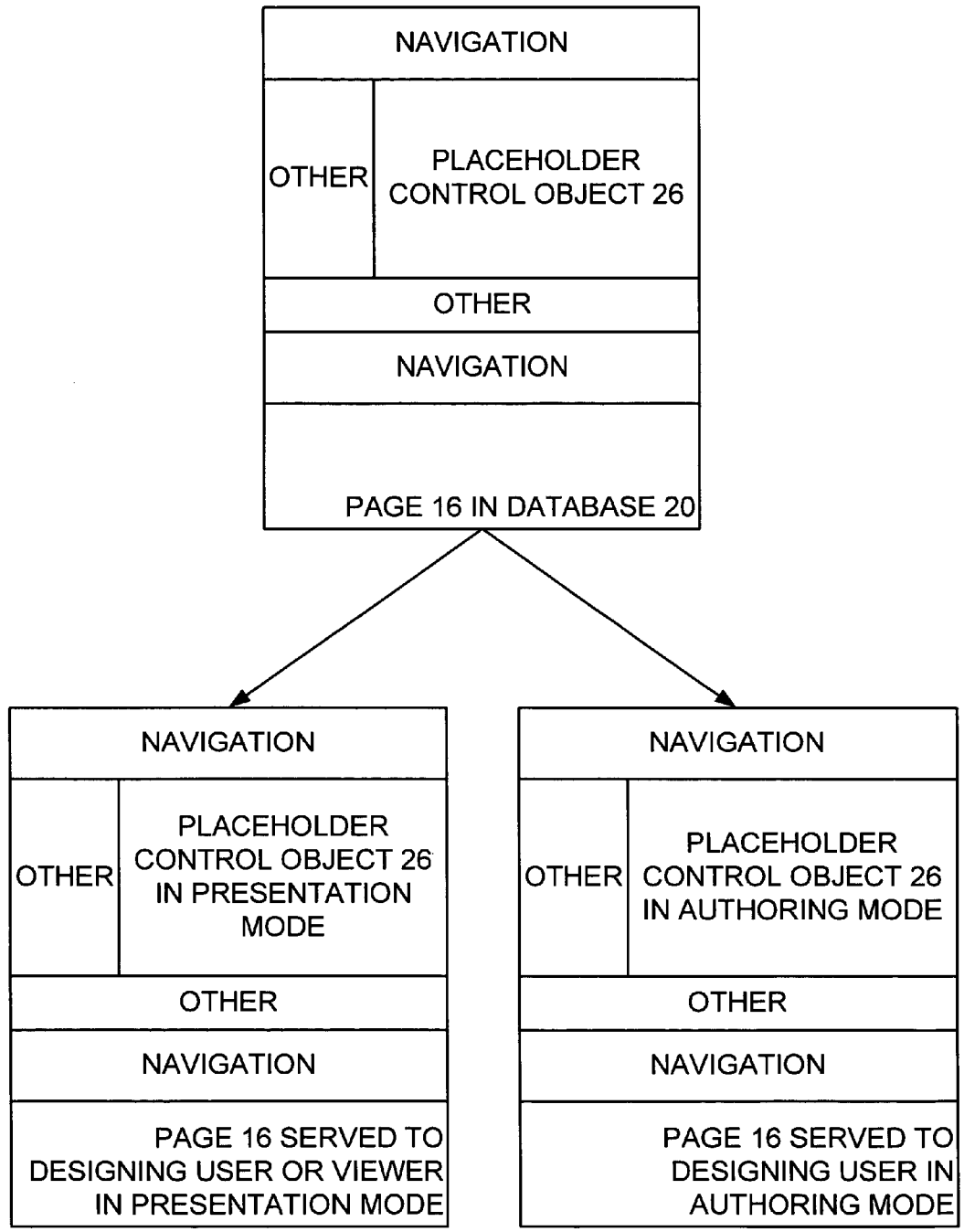
FIG. 3 is a block diagram showing a placeholder control object of the CMS system of FIG. 2 in accordance with one embodiment of the present invention.

In one embodiment of the present invention, and turning now to FIG. 3, one control object in the toolbox 24 of the authoring tool 14 is a placeholder control object 26 that holds the place of associated content within a page 16 and that functions differently depending upon the mode in which the CMS 12 is directed to serve such page 16. In particular, if the page 16 is to be served in a presentation mode (to the left in FIG. 3), the CMS 12 so serves such page 16 with the placeholder control object 26 appropriately displaying the associated content. Thus, and as may now be appreciated, the CMS 12 normally serves such page 16 with the placeholder control object 26 in the presentation mode when the page 16 is requested by a typical viewer, such as a customer perusing the corresponding web site 18.

Correspondingly, if the page 16 is to be served in an authoring mode (to the right in FIG. 3), the CMS 12 so serves such page 16 with the placeholder control object 26 appropriately displaying controls that allow the associated content to be edited, created, and/or modified. Thus, and as may also now be appreciated, the CMS 12 serves such page 16 with the placeholder control object 26 in the authoring mode when the page 16 is requested by a user editing or modifying or creating the page 16, such as a functionary in the enterprise running the CMS 12.

With the placeholder control object 26, then, and perhaps with the authoring tool 14 and the toolbox 24, an enterprise functionary can create, modify, and edit a page 16 directly within a browser that is displaying the page at a work station of the functionary, merely by switching the page 16 from a presentation mode to an authoring mode within the browser. Such switching between modes is achieved (1) by providing the placeholder control object 26 as stored at the CMS 12 within a page 16 with both authoring and presentation modes, and (2) by providing the CMS 12 with the ability to serve the page 16 with the placeholder control object 26 in either the authoring mode or the presentation mode depending upon the mode of the served page 16.

In one embodiment of the present invention, when a user selects to switch the page 16 and the placeholder control objects 26 therein between authoring mode and presentation mode, such mode switch is signaled to the CMS 12, which then serves such page 16 and the placeholder control objects 26 therein in such switched-to mode. Accordingly, the CMS 12 only provides the functionality appropriate to the switched-to mode. Thus, and for example, a viewer viewing the page 16 in presentation mode cannot somehow by accident or by design cause the placeholder control objects 26 in the page 16 to operate in authoring mode.

In one embodiment of the present invention, each placeholder control object 26 is instantiated from a class of such objects, including at least one base class and perhaps one or more inheriting classes that inherit from the base class. Note that by employing classes, a programmer may develop a custom placeholder control object 26 based on a placeholder control object 26 already existing in the toolbox 24 merely by defining the custom placeholder control object 26 as inheriting from the existing placeholder control object 26, and then by defining functionality specific to such custom placeholder control object 26.

As may be appreciated, a particular placeholder control object 26 may be any type of placeholder control object 26 without departing from the spirit and scope of the present invention. Typically, and as should now be appreciated, any particular placeholder control object 26 is designed to have content associated therewith, is defined to display such content when in presentation mode, and is designed to edit, create, or modify such content when in authoring mode. Note that it is also to be appreciated that a particular placeholder control object 26 can have radically different functionality as between presentation and authoring modes without departing from the spirit and scope of the present invention.

As an example of a placeholder control object 26, a simple text box placeholder control object 26 in presentation mode may display pre-defined text, and in authoring mode may allow the text to be modified by way of a text box control. Likewise, a text source placeholder control object 26 in presentation mode may display text from a pre-defined source such as a file or a network location, and in authoring mode may allow the source to be modified. Also likewise, a text selection placeholder control object 26 in authoring mode may allow a user to select from a pre-defined set of texts, and in presentation mode may display the selected text.

Similarly, a picture box placeholder control object 26 in presentation mode may display a pre-defined picture, and in authoring mode may allow the picture to be modified. Likewise, a picture source placeholder control object 26 in presentation mode may display a picture from a pre-defined source such as a file or a network location, and in authoring mode may allow the source to be modified. Also likewise, a picture selection placeholder control object 26 in authoring mode may allow a user to select from a pre-defined set of pictures, and in presentation mode may display the selected picture.

Aside from modifying content such as pictures and text, a placeholder control object may also allow rules to be defined with regard to whether and how to display the content. For example, a particular placeholder control object 26 may in authoring mode allow some sort of content to be defined and also allow display rules for whether to display the content to be defined. One such display rule may be that the content is not displayed if the user has not logged in. Thus, if the display rules are satisfied, the defined content is displayed in presentation mode. Similarly, the particular placeholder control object 26 may in authoring mode allow display rules for how to display the content to be defined. One such display rule may be that despite any default browser settings, the content is displayed in a certain style. Thus, the defined content is displayed in presentation mode according to the display rules.

Note, too, that the content need not merely be text or pictures. Instead, the content as defined for a placeholder control object may be an executable, a link to an object, an interactive tool, and the like. Also, the content as defined may be personalized to the viewer viewing same.

Significantly, regardless of whatever the content may be that is displayed in presentation mode, the placeholder control object 26 is defined to know how to load the content from the appropriate location thereof. Thus, the user need not be concerned with such details unless deemed necessary or desirable to do so. Note that the content may be loaded from an external location, such as a network site, a database, a remote file, and the like, or from an internal location, such as a buffer with the placeholder control object 26 within the page 16, a data file intimately associated with and tied to the page 16, and the like, all without departing from the spirit and scope of the present invention.

Also significantly, the placeholder control object 26 is defined to know how to save content to the appropriate location thereof. Thus, and again, the user need not be concerned with such details unless deemed necessary or desirable to do so. Such saving typically occurs in authoring mode, but saving may also occur in presentation mode for example in the situation where the placeholder control object collects data from a viewer thereof. Note that content may also be saved in a relatively simple manner such as for example simple text or in a more complex manner such as for example as partitioned database filed entries, all without departing from the spirit and scope of the present invention.

Figure 4:
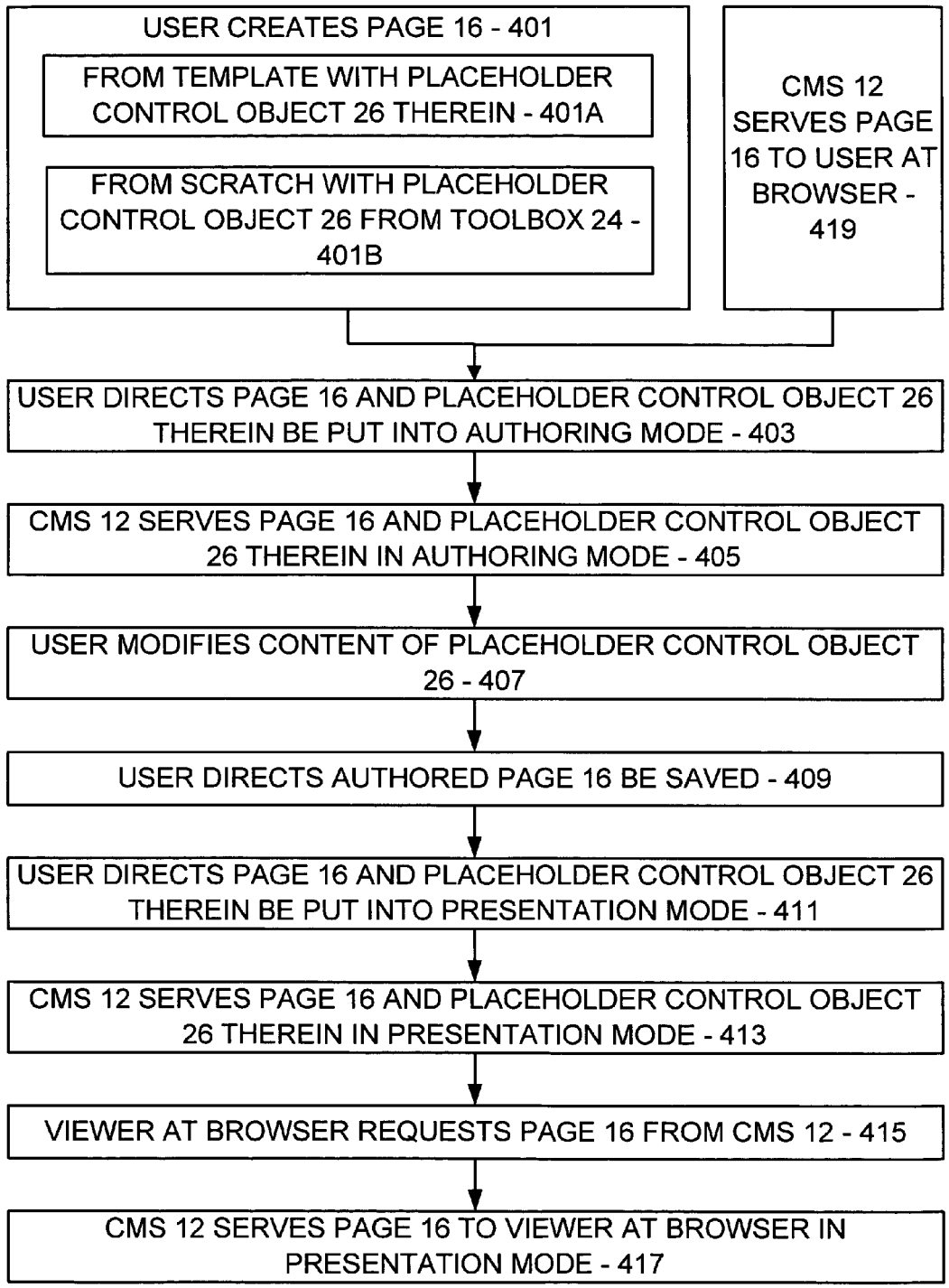
FIG. 4 is a flow diagram showing key steps performed in creating or editing a page with the placeholder control object of FIG. 3 in accordance with one embodiment of the present invention.

Turning now to FIG. 4, a method of employing a placeholder control object 26 in connection with a page 16 from a web site 18 is shown in accordance with one embodiment of the present invention. Presumably, the page 16 is first created by a user with the aid of the authoring tool 14 of the CMS 12 (step 401) and in the context of a browser. In particular, the user creates the page 16 either from a pre-defined template available to the user, where the template has one or more placeholder control objects 26 therein (step 401*a*), or from scratch with one or more placeholder control objects 26 as obtained from the toolbox 24 of such authoring tool 14 (step 401*b*). In the latter case, the user presumably has appropriate rights to so create the page 16 from scratch and not from a template, although it is to be appreciated that all pages 16 may be created from a template.

As may be appreciated, at some point during the creation of the page 16, the user defines for each placeholder control object 26 therein the contents thereof. In particular, the user first directs the authoring tool 14 to put the page 16 and each placeholder control object 26 therein into authoring mode (step 403), thereby causing the CMS 12 to in fact serve the page 16 and each placeholder control object 26 therein in authoring mode (step 405). Of course, any appropriate mechanism may be employed to in fact direct the authoring tool 14 to put the page 16 and each placeholder control object 26 therein into authoring mode without departing from the spirit and scope of the present invention. For example, the authoring tool may include a switch or button that alternates between authoring mode and presentation mode. Similar to before, the user presumably has appropriate rights to actuate the authoring mode with the authoring tool 14. It maybe the case that the actuating switch or button or the like appears to the user only if the user has such appropriate authoring rights.

Once in authoring mode, the user appropriately modifies the content of each placeholder control object 26 as desired and/or as necessary based on the type of such placeholder control object 26 (step 407). For example, for a picture selection placeholder control object 26, the user may select a particular picture from among a predetermined set of pictures, and from a text box placeholder control object 26, the user may alter the text to be displayed. In addition, if available, the user may re-size each placeholder control object 26 as it appears on the page 16 and/or may move the placeholder control object 26 to a different position on the page 16.

Once all authoring of the page 16 is complete, the user then directs the authoring tool 14 to save the authored page 16 (step 409). In one embodiment of the present invention, the authoring tool 14 and the CMS 12 automatically know how to in fact save the page 16, and accordingly the user need not be concerned with the actual mechanism thereof. Of course, once saved, the user may return to modifying the page 16 as at step 407 or may decide to end authoring of the page 16 by directing the authoring tool 14 to put the page 16 and each placeholder control object 26 therein into presentation mode (step 411), thereby causing the CMS 12 to in fact serve the page 16 and each placeholder control object 26 therein in presentation mode (step 413). Note that it may be the case that saving the page 16 as at step 409 may automatically place actuate presentation mode as at step 413. Likewise, it may be the case that actuating presentation mode as at step 413 may automatically save the page as at step 409, or at least prompt to the user to determine whether the page 16 is to be saved.

Once saved, and presuming the page 16 is otherwise available, the CMS 12 may then serve such page 16 to any requesting viewer at a browser thereof, presuming the viewer has the right to view the page. In particular, the CMS 12 receives a request for the page 16 from the viewer at the browser (step 415) and in response serves such page 16 to the viewer at the browser in presentation mode (step 417). Thus, the viewer can view the page 16 only and cannot modify any placeholder control object 26 in the page 16.

As may be appreciated, at some later point after the creation of the page 16, a user with appropriate rights may wish to edit and/or modify the page 16. For example, the user may wish to add or delete a placeholder control object 26 in the page 16 or to modify the contents of a placeholder control object 26 in the page 16. Accordingly, and in one embodiment of the present invention, the user navigates on a browser to the page 16 such that the CMS 12 serves the page 16 to the user at the browser thereof (step 419), and then directs the authoring tool 14 to put the page 16 and each placeholder control object 26 therein into authoring mode as at step 403.

Thus, and again, the CMS 12 serves the page 16 and each placeholder control object 26 therein in authoring mode as at step 405. In authoring mode, the user appropriately modifies the content of each placeholder control object 26 as desired and/or as necessary based on the type of such placeholder control object 26 as at step 407 and saves the authored page 16 as at step 409. Once saved, and again, the user may direct the authoring tool 14 to put the page 16 and each placeholder control object 26 therein into presentation mode as at step 411, and the CMS 12 may then serve such page 16 to any requesting viewer at a browser thereof as at step 417.

Dynamic Link Control Object

Figure 5:
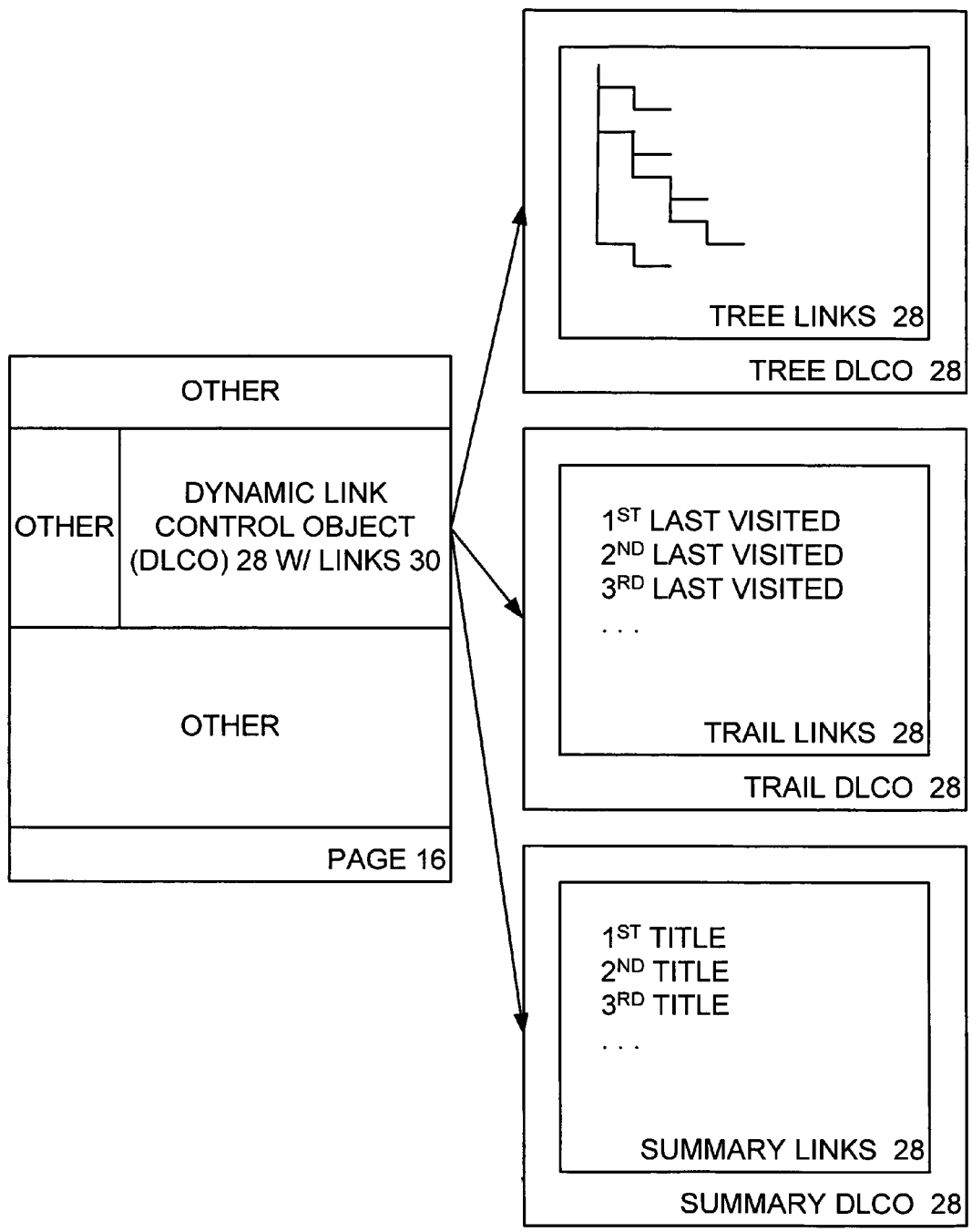
FIG. 5 is a block diagram showing a dynamic link control object of the CMS system of FIG. 2 in accordance with one embodiment of the present invention.

In another embodiment of the present invention, and turning now to FIG. 5, another control object in the toolbox 24 of the authoring tool 14 is a dynamic link control object (DLCO) 28 that when placed on a page 16 displays navigation links 30 associated with the page 16. As may be appreciated, a viewer viewing the page 16 may select one of the displayed links 30 to navigate to another page 16 corresponding to such selected link 30. Significantly, the DLCO 28 senses the context of the page 16 and functions differently depending upon such sensed context. In particular, a user selects and places a particular type of DLCO 28 on a page 16 so that the DLCO 28 displays particular links 30 that are relevant to the page 16. In doing so, the user need not be concerned with the specific links 30 that are to be displayed inasmuch as the DLCO 28 will determine such specific links 30 based on the functionality thereof. Instead, the user need only decide the types of links 30, and based thereon chooses an appropriate DLCO 28. Thus, a DLCO 28 on one page 16 may display different links 30 as compared to the same DLCO 28 on another page 16. Moreover, a DLCO 28 on one portion of a page 16 may display different links 30 as compared to the same DLCO 28 on another portion of the same page 16. Similarly, a DLCO 28 on a page 16 may display different links 30 to different viewers, different work stations, different geographic locations, etc.

A DLCO 28, then, is to be contrasted with the prior art wherein a user designing a page 16 manually specifies each link 30 that is to appear on the page 16. Such DLCO 28 is also to be contrasted with the prior art wherein a user designing a page 16 may choose a pre-built object from a library or database to appear on the page 16, where the pre-built object always displays the same links 30 irrespective of the page 16 upon which such pre-built object is located. Put another way, with the pre-built object of the prior art, the links 30 displayed thereby are unchanging or 'static', whereas with the DLCO 28 of the present invention, the links displayed thereby change and therefore are 'dynamic'. As may be appreciated, then, a DLCO 28 offers ease of use to a designing user in that such user need not consider navigation within a web site 18. Instead, each newly created page 16 is automatically added to all other site navigation links 30 on other pages 16.

The types of context regarding a page that may be relevant to a DLCO 28 can be any types of context without departing from the spirit and scope of the present invention. For example, a DLCO 28 may display different links 30 depending on the position of a page within a hierarchy of the web site 18, on the hierarchy itself, on a history of pages 16 of the web site 18 that have been viewed by a viewer, on the viewer himself or herself, on a computer employed by the viewer, on a sensed geographic location of the viewer, on a position of the DLCO 28 within the page 16, on a size of the DLCO 28 within the page 16, on pre-defined sections within the page 16, on the time of day, on the time of year, or the like.

In general, then, any DLCO 28 senses context comprising one or more attributes relevant to the page 16, and based thereon displays particular links 30 on the page 16. With the authoring tool 14, the toolbox 24, and the DLCO 28, then, an enterprise functionary can create particular types of links 30 on a page 16 merely by placing an appropriate type or variety of DLCO 28 on the page 16, perhaps in an appropriate location thereon.

In one embodiment of the present invention, each DLCO 28 is instantiated from a class of such objects, including at least one base class and perhaps one or more inheriting classes that inherit from the base class. Note that by employing classes, a programmer may develop a custom DLCO 28 based on a DLCO 28 already existing in the toolbox 24 merely by defining the custom DLCO 28 as inheriting from the existing DLCO 28, and then by defining functionality specific to such custom DLCO 28.

As may be appreciated, a particular DLCO 28 may be any type of DLCO 28 without departing from the spirit and scope of the present invention. Typically, and as should now be appreciated, any particular DLCO 28 is designed to display particular types of links 28 relevant to the particular context of a page 16 upon which the DLCO 28 is placed. Of course, a DLCO 28 may also be designed to display static links 30 that do not change with the particular context of a page 16, if so desired or required. Examples of such a DLCO 28 follow.

One type of DLCO 28 is a tree DLCO 28 (to the top in FIG. 5), that displays links 30 relevant to the hierarchical tree of a web site 18 with which a page 16 is associated. That is, and as should be appreciated, a web site 18 as hosted by a typical CMS 12 includes a plurality of pages 16 organized into a hierarchical structure or tree. For example, the web site 18 may have a 'home' page 16 at the base of the tree, various first level pages 16 branching from the home page 16, various second level pages 16 branching from the first level pages 16, and so forth. Typically, the CMS 12 knows such hierarchical tree and the position of each page 16 therein, or can build such hierarchical tree as necessary. Thus, a tree DLCO 28 positioned on a particular page 16 of such web site 18 can display links 30 relating to such hierarchical tree.

In one instance, the links 30 displayed by a DLCO 28 with respect to a particular page 16 from a web site 18 are links 30 to further levels of the hierarchical tree as such tree extends from the particular page 16. Thus, the links 30 displayed are for pages 16 that branch from the particular page 16. In another instance, the links 30 displayed are for pages 16 that branch from another location within the hierarchical tree, such as for example pages 16 that branch from the home page 16, or pages 16 that branch from the parent or grandparent page 16 of the particular page 16. As may be appreciated, in such a situation, the branching page 16 for the tree DLCO 28 may be set to any page 16 in the tree without departing from the spirit and scope of the present invention, as long as such set page 16 can be related to the particular page 16.

Note that with the tree DLCO 28 and with other DLCOs 28, various options may be set by a user defining such DLCO 28. For example, the font and/or style of each link 30 may be set, as well as where to display the link, such as for example in the present pane, in a parent pane, in a child pane, etc. Note, too, that specific types of DLCOs 28 may have options relevant thereto. For example, a tree DLCO 28 may have an option to display tree links 30 from the top down or from the left to the right, and an option to select the aforementioned branching page 16 by its relation to the particular page 16, among others.

Another type of DLCO 28 is a trail DLCO 28 (to the center in FIG. 5) that displays a navigation trail of where a viewer has visited within the web site 18. As may be appreciated, the CMS 12 typically maintains such trail information and therefore can construct links 30 with such trail DLCO 28 with relative ease. For example, if the viewer jumps among multiple pages 16 within the web site 18, a trail DLCO 28 may be placed on each page 16 to display a backward trail of links 30 corresponding to the order with which such pages 16 were visited, perhaps back a certain number of steps such as for example 5, 10, or 15. Thus, if the viewer decides to go back a number of pages 16 within the web site 18 from a currently viewed page 16, such user need only select the corresponding displayed link 30 from the trail DLCO 28 on such currently viewed page.

Yet another type of DLCO 28 is a summary DLCO 28 (to the bottom in FIG. 5) that summarizes a currently viewed page 16. For example, if the page 16 has a long list of titled items, a summary DLCO 28 may merely list a link 30 to the title of each item. Such titles may for example be sections within a document or titles of news items, where each titled news item is followed by at least a portion of the body of such news item. Thus, a viewer viewing a page 16 of such titled items may merely review the links 30 to the titles of the items as summarized within a summary DLCO 28 on the page 16, and by choosing an appropriate one of the links 30 the viewer is transported to such item on the page 16. Parenthetically, it is to be appreciated that each item or at least a portion thereof may appear on the page 16 in the form of an appropriate placeholder control object 26, as was discussed above in connection with FIGS. 3 and 4.

To summarize, then, any DLCO 28 is characterized by the fact that placing such DLCO 28 on a page 16 causes the DLCO 28 to display links 30 in a dynamic manner such that the displayed links 30 are relevant to the page 16. Accordingly, the displayed links 30 can vary from page 16 to page 16 and can even based on attributes relating to the page 16 or the position of the DLCO 28 within the page 16, among other things. Thus, a user designing a page 16 can design the links 30 for the page merely by placement of one or more appropriate DLCOs 28 thereon.

Other types of DLCOs 28 include but are not limited to: a position sensitive DLCO 28 that displays links 30 based on whether positioned at the top, bottom, left, side, right side, center, etc. of a page 16; a rights sensitive DLCO 28 that displays links 30 based on what rights the viewer has at the web site 18; a viewer sensitive DLCO 28 that displays links 30 based on who the viewer is and/or characteristics thereof; an environmentally sensitive DLCO 28 that displays links 30 based on environmental considerations such as time of day, weather local to the viewer, geographic location of the viewer, etc.; a mood sensitive DLCO 28 that displays links 30 based on sensed viewer mood as determined from detectable viewer mood characteristics; and the like.

As may be appreciated, a page 16 with a DLCO 28 therein is designed either from a pre-defined template available to the designing user, where the template has one or more DLCO 28 therein, or from scratch with one or more DLCOs 28 as obtained from the toolbox 24 of the authoring tool 14. In the latter case, the user presumably has appropriate rights to so create the page 16 from scratch and not from a template. Designing a page 16 with a DLCO 28 therein may be performed in any appropriate manner without departing from the spirit and scope of the present invention.

Figure 6:
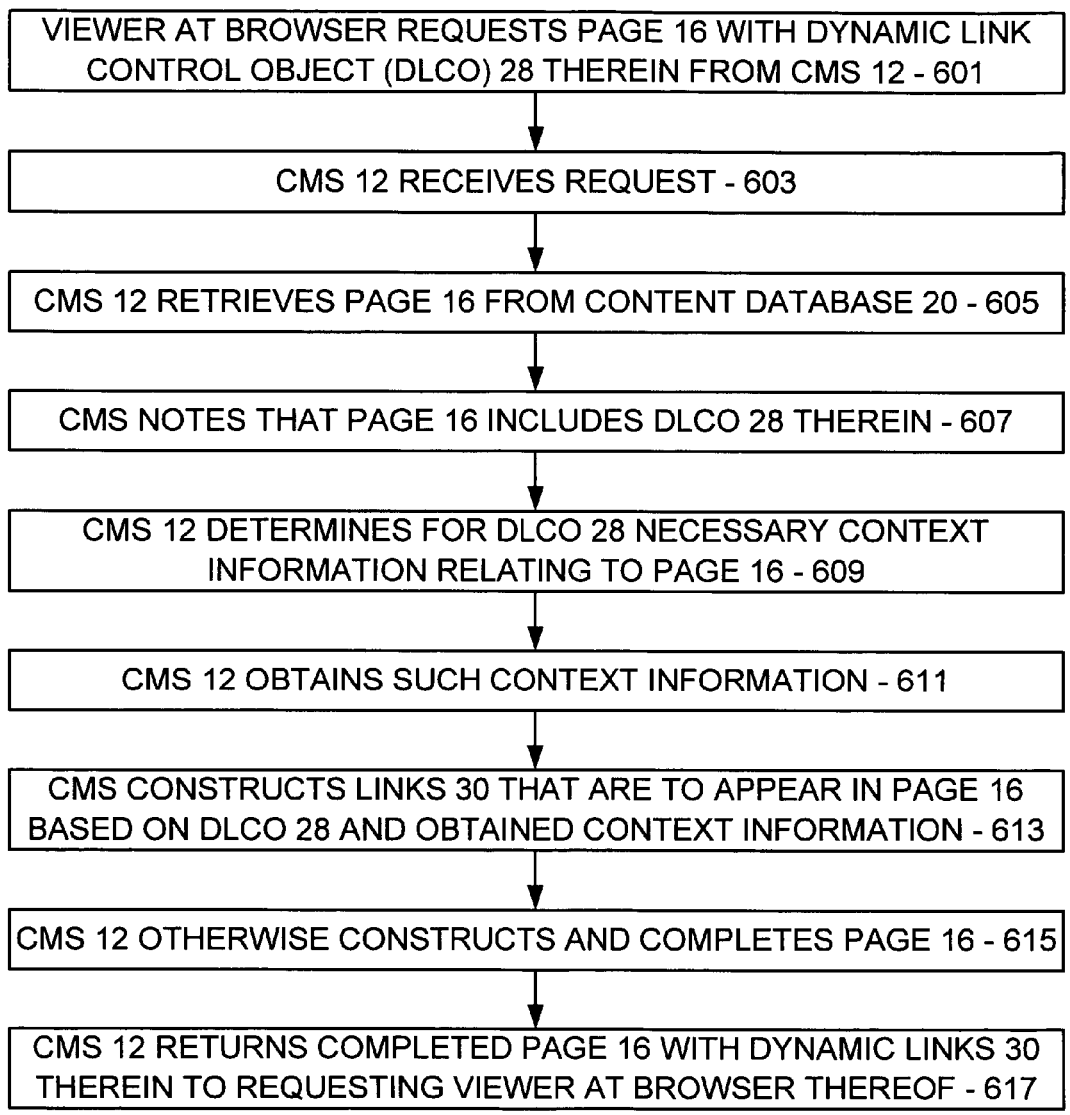
FIG. 6 is a flow diagram showing key steps performed in serving a page with the dynamic link control object of FIG. 5 in accordance with one embodiment of the present invention.

Turning now to FIG. 6, a method for the CMS 12 to serve a page 16 with at least one DLCO 28 therein in the course of hosting a web site 18 is shown in accordance with one embodiment of the present invention. Preliminarily, and as should be appreciated, a viewer at a browser of a work station decides to view the page 16 with the at least one DLCO 28 therein and therefore sends a request to the CMS 12 for the page 16 (step 601). Note that the request may be initiated by selecting a link 30 on another page 16 of the web site 18, or by selecting a link for the page 16 from another web site, or by directly entering a locator for the page 16 into the browser. At any rate, the CMS 12 receives the request from the viewer for the page 16 with the at least one DLCO 28 therein (step 603), retrieves the page 16 from the content database 20 (step 605), and notes that the page 16 includes the at least one DLCO 28 therein (step 607).

Accordingly, the CMS 12 examines each DLCO 28 in the page 16 to determine the type thereof, and more significantly determines regarding the DLCO 28 what kind of context information relating to the page 16 must be obtained (step 609). For example, for the tree DLCO 28, the CMS 12 determines that the hierarchical tree for the web site 18 of the page 16 must be obtained, for the summary DLCO 28, the CMS 12 determines what titles are in the page 16, and for the trail DLCO 28, the CMS 12 determines the prior history of the viewer at the web site 18. Note that the context information ideally should be present at the CMS 12, although it is to be appreciated that in certain instances such context information must be obtained externally from the CMS 12. For example, for an environmentally sensitive DLCO 28 based on weather local to the viewer, the CMS 12 must determine the geographic location of the viewer and the weather thereat, presumably both fro external sources. At any rate, once it is determined what kind of context information is needed, the CMS 12 in fact obtains such context information (step 611).

Thereafter, based on the DLCO 28, the page 16 thereof, the obtained context information, and perhaps other information, the CMS constructs the links 30 that are to appear in the page 16 based on the DLCO 28 (step 613). Constructing such links 30 of course varies based on the page 16, the DLCO 28, and the context information, and therefore cannot be described in any general sense except to say that the CMS 12 may know how to construct the links 30 for the DLCO 28 either from the DLCO 28 directly or based on knowledge of the DLCO 28 without departing from the spirit and scope of the present invention. In the latter case, the DLCO 28 may know how to construct the links 30 for the DLCO 28 based on knowledge of the DLCO 28 because the DLCO 28 and construction information therefore were previously registered to the CMS 12.

Once the CMS 12 has traversed each DLCO 28 in the page 16 and has constructed corresponding links 30 based thereon for the page 16, and once the CMS 12 has otherwise completed construction of the page 16 (step 615), the CMS 12 then returns the completed page 16 with the dynamic links 30 therein to the requesting viewer at the browser of the work station thereof (step 617). The CMS 12 may then perform any necessary or desired housekeeping functions. For example, in the event a trail DLCO 28 may be present in a page 16 of the web site 18, the CMS 12 may update the history of the requesting viewer.

CONCLUSION

The programming necessary to effectuate the processes performed and structures created in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful CMS system 10 with an authoring tool 14 that is usable by a non-technical enterprise functionary to create, modify, and/or edit a page 16 of content to be served by the CMS 12 of the system 10. The authoring tool 14 has a toolbox 24 of control objects, where the functionary can at least in part design a page 16 by laying out on the page 16 one or more control objects from the toolbox 24 and then editing each control object as necessary. One control object is a placeholder control object 26 that functions in an authoring mode to facilitate authoring of content on the page 16 and in a presentation mode to facilitate presentation of the authored content on the page 16, depending on whether the page 16 is being authored or presented. Another control object is a dynamic link control object (DLCO) 28 that functions to dynamically present links 30 to a viewer on a page 16 depending on the context of the page 16.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A system comprising:
 a content management server (CMS) that hosts a website;
 a first page of the website, the page being served by the CMS; and
 a placeholder control object that is positioned on the first page and is associated with a first content of the first page, the placeholder control object while in an authoring mode providing a first control adapted for editing of the first content, the placeholder control object while in presentation mode providing a second control for rendering the first content,
 wherein responsive to a first request from a first user that the CMS serve the first page with a placeholder control object in a presentation mode, the CMS serves the first page with the placeholder control object in the presentation mode and the placeholder control object provides the second control to render the first content at the position occupied by the placeholder control object within the first page within a browser of the user, and
 wherein responsive to a second request from the first user that the CMS serve the first page with the placeholder control object in an authoring mode, the CMS serves the first page with the placeholder control object in the authoring mode and the placeholder control object provides the first control to allow for editing of the first content while the first content is displayed at the same position occupied by the placeholder control object within the first page as when the first page is served in the presentation mode within the browser and allows saving edited first content to the CMS.

2. The system of claim 1, wherein in the presentation mode the first content cannot be edited or saved to the CMS from the browser.

3. The system of claim 1, wherein the first content comprises a picture and/or text.

4. The system of claim 1, wherein the placeholder control object in the presentation mode displays the first content according to a rule of the placeholder control object, the rule defining whether to display the first content, and wherein the placeholder control object in the authoring mode allows editing of the rule and saving the edited rule to the CMS.

5. The system of claim 1, wherein the placeholder control object includes information on where to store and obtain the first content.

6. The system of claim 1, wherein placeholder control object in authoring mode allows editing of the first content in a WYSIWYG manner.

7. The system of claim 1, further comprising an authoring tool for allowing the first user to select the placeholder control object and position the placeholder control object on the first page.

8. The system of claim 7, wherein when the placeholder control object is in the authoring mode, the authoring tool comprises a toolbox containing a plurality of control objects from which the first user may construct the first page.

9. The system of claim 8, wherein the placeholder control object is instantiated from at least one base class of the plurality of control objects.

10. The system of claim 9, wherein the placeholder control object inherits at least one class from the base class.

11. A computer-implemented method comprising:
receiving a first request from a user to serve a first page in a presentation mode, a placeholder control object associated with first content of the first page and being positioned on the first page, the placeholder control object while in an authoring mode providing a first control adapted for editing of the first content, the placeholder control object while in presentation mode providing a second control for rendering of the first content;
in response to the first request, placing the placeholder control object in the presentation mode;
serving the first page to a browser of the user with the placeholder control object in the presentation mode, the placeholder control object providing the second control to render the first content at the position occupied by the placeholder control object within the first page within the browser;
receiving an indication to switch from the presentation mode to an authoring mode;
in response to receiving the indication, serving the first page to the browser with the placeholder control object in the authoring mode, the placeholder control object providing the first control to allow for editing of the first content while the first content is displayed at the same position occupied by the placeholder control object within the first page as when the first page is served in the presentation mode within the browser and allowing saving edited first content as second content of the first page; and
storing the first page with the placeholder control object and the second content in a content management system.

12. The method of claim 11 further comprising creating the first page from a pre-defined template.

13. The method of claim 11 further comprising creating the first page by editing an already-existing page.

14. The method of claim 11 wherein in the authoring mode, the placeholder control object allows editing a size of the placeholder control object on the first page.

15. The method of claim 11 wherein in the authoring mode, the placeholder control object allows editing placement of the placeholder control object on the first page.

16. The method of claim 11 further comprising after storing the first page, receiving a second request from the user to serve the first page in the presentation mode;
in response to the second request, placing the placeholder control object in the presentation mode;
serving the first page to a browser of the user with the placeholder control object in the authoring mode, the placeholder control object displaying the second content within the browser.

17. The method of claim 11 further comprising in response to the first request, placing a second placeholder control object in presentation mode, the second placeholder control object being positioned on the first page and associated with third content of the first page, wherein serving the first page to a browser includes serving the first page to the browser of the user with the placeholder control object and the second placeholder control object in the presentation mode, the placeholder control object displaying the first content within the browser and the second placeholder control object display the second content within the browser.

18. A computer readable storage medium having computer executable instructions stored thereon that when executed by a processor perform the method comprising:
receiving a first request from a user to serve a first page in a presentation mode, a placeholder control object associated with first content of the first page and being positioned on the first page, the placeholder control object while in an authoring mode providing a first control adapted for editing of the first content, the placeholder control object while in the presentation mode providing a second a second control for rendering of the first content;
in response to the first request, placing the placeholder control object in the presentation mode;
serving the first page to a browser of the user with the placeholder control object in the presentation mode, the placeholder control object providing the second control to render the first content at the position occupied by the placeholder control object within the first page within the browser;
receiving an indication to switch from the presentation mode to an authoring mode;
in response to receiving the indication, serving the first page to the browser with the placeholder control object in the authoring mode, the placeholder control object providing the first control to allow for editing of the first content while the first content is displayed at the same position occupied by the placeholder control object within the first page as when the first page is served in the presentation mode within the browser and allowing saving edited first content as second content of the first page; and
storing the first page with the placeholder control object and the second content in a content management system,
wherein the control object in the presentation mode displays the first content according to a rule of the placeholder control object, the rule defining whether to display the first content, and wherein the placeholder control object in the authoring mode allows editing of the rule and saving the edited rule to the CMS.

19. The computer readable storage medium of claim 18 further comprising creating the first page from a pre-defined template.

20. The computer readable storage medium of claim 18 further comprising creating the first page by editing an already-existing page.

21. The computer readable storage medium of claim 18 wherein in the authoring mode, the placeholder control object allows editing a size of the placeholder control object on the first page.

22. The computer readable storage medium of claim 18 wherein in the authoring mode, the placeholder control object allows editing placement of the placeholder control object on the first page.

23. The computer readable storage medium of claim 18 further comprising after storing the first page, receiving a second request to from the user to serve the first page in the presentation mode;
- in response to the second request, placing the placeholder control object in the presentation mode;
- serving the first page to a browser of the user with the placeholder control object in the authoring mode, the placeholder control object displaying the second content within the browser.

24. The computer readable storage medium of claim 18 further comprising in response to the first request, placing a second placeholder control object in presentation mode, the second placeholder control object being positioned on the first page and associated with third content of the first page, wherein serving the first page to a browser includes serving the first page to the browser of the user with the placeholder control object and the second placeholder control object in the presentation mode, the placeholder control object displaying the first content within the browser and the second placeholder control object display the second content within the browser.

* * * * *